United States Patent
Okada et al.

(10) Patent No.: US 8,000,086 B2
(45) Date of Patent: Aug. 16, 2011

(54) CHIP CAPACITOR

(75) Inventors: Kazuto Okada, Toyonaka (JP); Hiroaki Kotera, Toyonaka (JP); Yasunori Kinugawa, Toyonaka (JP); Kiyoharu Tsunetoshi, Toyonaka (JP); Masatoshi Niki, Toyonaka (JP)

(73) Assignee: Matsuo Electric Company, Limited, Toyonaka-Shi, Osaka-Fu (JP)

( * ) Notice: Subject to any disclaimer, the term of this patent is extended or adjusted under 35 U.S.C. 154(b) by 261 days.

(21) Appl. No.: 12/396,521

(22) Filed: Mar. 3, 2009

(65) Prior Publication Data

US 2009/0237866 A1  Sep. 24, 2009

(30) Foreign Application Priority Data

Mar. 19, 2008 (JP) ................. 2008-071137

(51) Int. Cl.
*H01G 4/228* (2006.01)
*H01G 9/00* (2006.01)
(52) U.S. Cl. ........................ 361/540; 361/539
(58) Field of Classification Search .................. 361/528, 361/531–533, 535–540
See application file for complete search history.

(56) References Cited

U.S. PATENT DOCUMENTS

| | | |
|---|---|---|
| 3,781,976 A | 1/1974 | Tomiwa |
| 5,716,420 A | 2/1998 | Kuriyama |
| 6,262,878 B1 * | 7/2001 | Shirashige et al. ......... 361/508 |
| 6,346,127 B1 | 2/2002 | Kuriyama |
| 6,368,363 B1 | 4/2002 | Kobatake et al. |
| 6,467,142 B1 | 10/2002 | Shirashige et al. |
| 6,808,541 B2 * | 10/2004 | Maeda ..................... 29/25.03 |
| 7,133,276 B2 * | 11/2006 | Fujii et al. ................. 361/523 |
| 2002/0163775 A1 * | 11/2002 | Maeda ...................... 361/528 |
| 2008/0106854 A1 * | 5/2008 | Ishijima .................... 361/538 |

FOREIGN PATENT DOCUMENTS

| | | |
|---|---|---|
| JP | 55-47449 B2 | 11/1980 |
| JP | 1-29050 B1 | 6/1989 |
| JP | 2007-317929 | 6/2007 |

* cited by examiner

*Primary Examiner* — Eric Thomas
(74) *Attorney, Agent, or Firm* — Duane Morris LLP

(57) ABSTRACT

A capacitor element having an upper surface, a lower surface, a first end surface and a second end surface is coated with a cathode layer, except for the first end surface. Anode lead extends out from the first end surface. An anode terminal has a first portion located close to and beneath the lower surface of the capacitor element and has a second portion connected to the anode lead via an arcuate connector. A cathode terminal is disposed under the lower surface of the capacitor element, being spaced from the first portion of the anode terminal. A packaging resin covers the capacitor element, the anode terminal and the cathode terminal. A depression is formed in the anode terminal, which extends from a portion of the anode terminal facing the lower surface of the capacitor element to the inner edge of the anode terminal facing the cathode terminal.

4 Claims, 1 Drawing Sheet

CHIP CAPACITOR

FIELD OF THE INVENTION

This invention relates to a bottom-electrode type chip capacitor, and, more particularly, to insulation of a cathode layer of a capacitor element and an anode electrode of such capacitor from each other.

BACKGROUND OF THE INVENTION

An example of chip capacitors is disclosed in, for example, Patent Literature 1. The chip capacitor disclosed in Patent Literature 1 has a cathode layer around a capacitor element having a generally rectangular parallelepiped shape. A tantalum wire extends outward from one end of the capacitor element. A planar cathode terminal is located beneath and in parallel with the bottom of the cathode layer and is electrically connected to the bottom of the cathode layer by an electrically conductive adhesive. One end of a planar anode terminal is located beneath the bottom of the cathode layer, and the other end of the anode terminal is located near the tip end of the tantalum wire. An insulating resin is applied between the anode terminal and the cathode layer to insulate them from each other. The tip end of the tantalum wire and the other end of the anode terminal are connected to each other by a column-shaped connector, and the capacitor element and the tantalum wire connector are covered by a resin.

Another example of chip capacitors is disclosed in Patent Literature 2. The chip capacitor disclosed in Patent Literature 2 includes a capacitor element having a rectangular parallelepiped shape. A cathode layer is formed on the capacitor element, and has its lower surface connected to a cathode terminal. An anode lead extending from one end surface of the capacitor element is connected to an anode terminal. The anode terminal has a planar portion and includes an upright portion extending vertically upward from a portion near the center of the upper surface of the planar portion of the anode terminal. The top end of the upright portion of the anode terminal is connected to the anode lead. The end of the anode terminal planar portion is located near the end surface of the capacitor element from which the anode lead extends out. The upper surface portion of the anode terminal portion between the upright portion and the end on the capacitor element side is thinned so that a gap is formed between the anode terminal and the capacitor element. The anode terminal, the cathode terminal and the capacitor element are covered by a resin. The resin is also placed in the gap between the anode terminal and the capacitor element to fill it.

CITATION LIST

Patent Literature

Patent Literature 1: U.S. Pat. No. 6,467,142
Patent Literature 2: JP 2007-317929 A

SUMMARY OF THE INVENTION

Technical Problem

In order to minimize the size and thickness, the anode terminal of the chip capacitor disclosed in Patent Literature 1 extends to a location beneath the capacitor element. This arrangement makes it necessary to dispose an insulating resin between the anode terminal and the cathode layer of the capacitor element to insulate them from each other. Application of such insulating resin increases the material cost and the number of manufacturing steps, which, in turn, raises the cost of the chip capacitor. According to the technique disclosed in Patent Literature 2, it is not necessary to dispose an insulating resin between the cathode layer and the anode terminal, but, since the upright portion projects at a location halfway between the outer and inner ends, the entire size of the capacitor resulting from covering the anode terminal, the capacitor element and the cathode terminal with the resin is large. If one tries to make the capacitor smaller, it would be necessary to use a smaller capacitor element to be disposed within the resin, which cannot improve the volume efficiency of capacitors.

An object of the present invention is to provide a small-sized chip capacitor, in which the insulation of a cathode layer of a capacitor element and an anode terminal from each other is maintained without resort to the use of an insulating resin, and which has an improved volume efficiency.

Solution to Problem

A chip capacitor according to an aspect of the present invention includes a capacitor element having a cathode layer formed on the outer surfaces thereof. The capacitor element has opposing upper and lower surfaces and two, first and second end surfaces extending perpendicular to the upper and lower surfaces. The first end surface is free of the cathode layer. An anode lead extends outward from the first end surface. An anode terminal has a first portion located beneath and near the lower surface of the capacitor element and also has a second portion connected to the anode lead. A cathode terminal is disposed beneath the lower surface of the capacitor element, being spaced from the first portion of the anode terminal. The cathode terminal is connected to the lower surface of the capacitor element. The capacitor element, the anode terminal and the cathode terminal are surrounded by a packaging resin, except the lower surfaces of the anode and cathode terminals. The upper surfaces of the cathode and anode terminals are substantially at the same level, and the lower surfaces of the cathode and anode terminals are substantially at the same level. The exposed lower surfaces of the anode and cathode terminals have substantially the same area. A depression is formed in at least the first portion of the upper surface of the anode terminal facing the lower surface of the capacitor element. The depression extends to the inner edge of the anode terminal. The depression may be formed by etching, more specifically, chemical etching or plasma etching, or grinding by, for example, micro processing technologies. The edge of the depression remote from the capacitor element is curved, and the packaging resin extends through the depression to the cathode terminal.

In order for the exposed surface portions of the anode and cathode terminals of the chip capacitor of the above-described arrangement to have equal areas and for the chip capacitor to be minimized, the first portion of the anode terminal is disposed beneath the capacitor element, which could cause the anode terminal and the capacitor element to contact with each other. To avoid such contact, the depression is formed in the anode terminal, and a resin is place to fill the depression. The presence of the curved portion in the depression makes it sure that the resin flows into the depression via the curved portion, so that the anode terminal can be insulated from the capacitor element.

The depression may curve downward toward the lower surface of the anode terminal, starting from a location remoter from the capacitor element than the first end surface of the capacitor element. With this arrangement, the resin can reach every part of the depression.

The corner of the capacitor element between the first end surface and lower surface of the capacitor element may be rounded, so that the spacing between the capacitor element and the anode terminal can be increased, which, in turn, improves the insulation of the capacitor element against the anode terminal.

The anode terminal and the anode lead may be connected to each other by means of a connector disposed on the upper surface of the anode terminal at a location spaced from the depression. The connector is formed to have an arcuate surface facing the capacitor element, which is connected to the tip end of the anode lead.

With this arrangement, the connector and the capacitor element are sufficiently spaced from each other to provide a sufficiently large gap between the connector and the capacitor element, which allows the insulating resin to spread all over the gap. Further, because of this gap, the capacitor element can have a size near the size of the package provided by the resin can be employed, which improves the volume efficiency.

Advantageous Effects of Invention

As described above, the present invention can provide a chip capacitor with more reliable insulation of the cathode layer of the capacitor element against the anode terminal than prior art capacitors.

BRIEF DESCRIPTION OF DRAWINGS

The sole FIGURE is a longitudinal cross-sectional view of a chip capacitor according to an embodiment of the present invention.

DETAILED DESCRIPTION OF THE INVENTION

Figure 1:
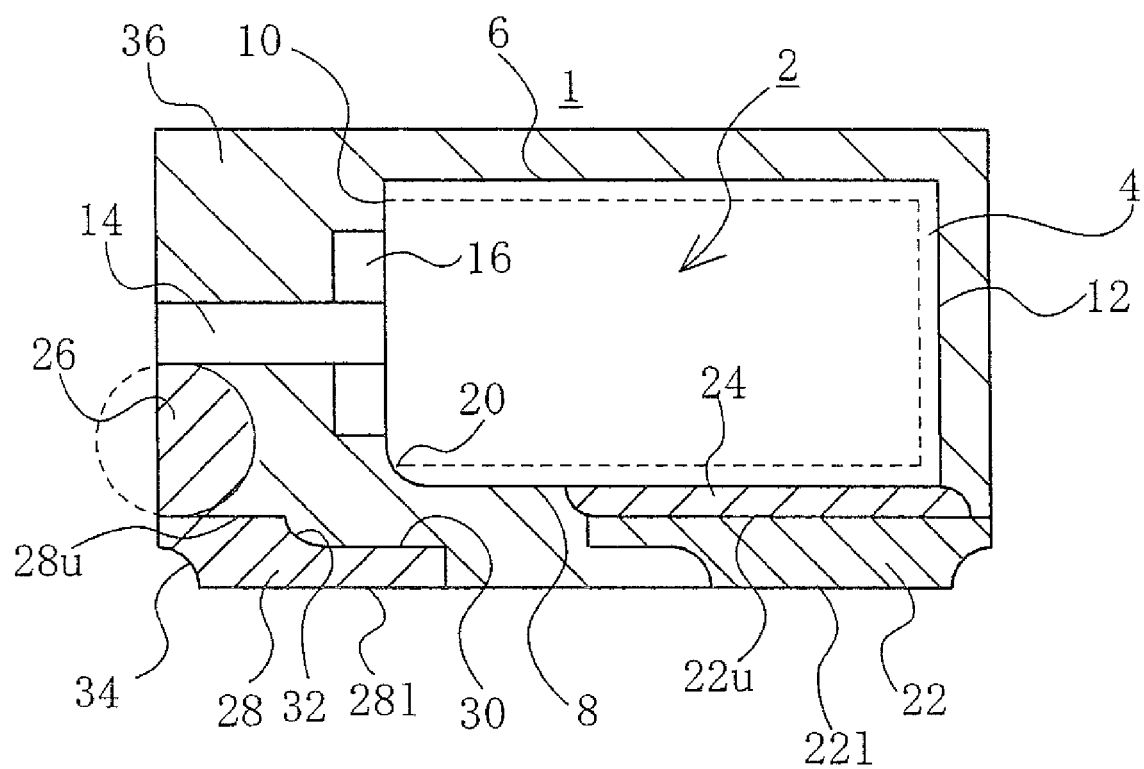

As shown in the sole FIGURE, a chip capacitor 1 according to an embodiment of this invention includes a capacitor element 2. The capacitor element 2 is a solid electrolytic capacitor element having, for example, a generally rectangular parallelepiped shape. The capacitor element 2 has opposing upper and lower surfaces 6 and 8, respectively, and opposing two end surfaces, namely first and second end surfaces 10 and 12 extending generally perpendicular to the upper and lower surfaces 6 and 8. A cathode layer 4 is formed on the outer surfaces of the capacitor element 2, except for the first end surface 10. An anode lead 14 extends perpendicularly outward from a substantially central portion of the first end surface 10. The anode lead 14 has a shape of, for example, a small column and has its proximal end portion near the first end surface 10 covered by a cover ring 16. The corner between the first end surface 10 and the lower surface 8 of the capacitor element 2 is curved into a convex portion 20.

A cathode terminal 22 is coupled to the lower surface 8 of the capacitor element 2. The cathode terminal 22 is formed into a generally planar shape, and is disposed such that its one end extends out slightly beyond the end surface 12 with the other end located at a point beyond the mid point between the end surfaces 10 and 12 toward the first end surface 10. The upper surface 22$u$ of the cathode terminal 22 is electrically and mechanically coupled to the lower surface 8 of the capacitor element 2 by an electrically conductive adhesive 24.

The anode lead 14 has its distal end connected to a connector 26, which, in turn, is connected to the anode terminal 28.

The connector 26 has a generally semi-circular transverse cross-section, with the convex surface thereof facing the first end surface 10 of the capacitor element 2. The anode terminal 28 has its one end located substantially flush with the distal end of the anode lead 14 and has the other end located at a point slightly beyond the first end surface 10 of the capacitor element 2 toward the end surface 12. The anode terminal 28 is disposed being spaced from the cathode terminal 22. The upper surface 28$u$ of the anode terminal 28 is substantially at the same level as the upper surface 22$u$ of the cathode terminal 22. The lower surface 28$l$ of the anode terminal 28 is substantially at the same level as the lower surface 22$l$ of the cathode terminal 22. The lower surfaces 28$l$ and 22$l$ of the anode and cathode terminals 28 and 22 have substantially the same area. In order to downsize the chip capacitor 1 with the lower surfaces 22$l$ and 28$l$ having the same area, the end of the anode terminal 28 near the capacitor element 2 is located beyond the first end surface 10 of the capacitor element 2 toward the center of the capacitor element 2.

As a result, the distance between the upper surface 28$u$ of the anode terminal 28 and the lower surface 8 of the capacitor element 2 is short. The upper surface 28$u$ of the anode terminal 28 is provided with a downward depression 30, which extends from a portion outward of the first end surface 10 of the capacitor element 2 to the inner edge of the anode terminal 28. The outer portion of the upper surface 28$u$ of the anode terminal 28 is connected to the outer portion of the depression 30 by a gradually curved, arcuate portion 32. The curved portion 32 is formed being spaced from the connector 26. The curved portion 32 and the depression 30 can be formed by, for example, chemically etching the anode terminal 28. Because of the use of etching, the dimensional precision of the curved portion 32 and the depression 30 can be high. When the depression 30 and the curved portion 32 are etched, the edge of the lower surface 28$l$ of the anode electrode 28 remote from the capacitor element 2 is also arcuately etched away by the chemical etching to form a curved portion 34. The curved portion 34 is used to solder the anode terminal 28 to a printed circuit board (not shown). The surface of the curved portion 34 is convex toward the capacitor element 2, while the surface of the curved portion 32 is convex toward the curved portion 34 away from the capacitor element 2.

By virtue of the presence of the depression 30, although the upper surface 28$u$ of the anode terminal 28 is at substantially the same level as the upper surface 22$u$ of the cathode terminal 22, which, in turn, is substantially at the same level as the lower surface 8 of the capacitor element 2, a gap can be formed between the capacitor element 2 and the anode terminal 28. In addition, by virtue of the presence of the curved surface 20 at the lower corner of the first end surface 10 of the capacitor element 2, which is relatively near to the anode terminal 28, a sufficient spacing can be additionally secured between the anode terminal 28 and the capacitor element 2.

Furthermore, the connector 26 is formed to have a shape of column having a part cut off along a plane extending in parallel with the longitudinal axis of the column, and has its upper and lower ends respectively connected to the tip end of the anode lead 14 and the outer end portion of the upper surface 28$u$ of the anode terminal 28 remote from the first end surface 10 of the capacitor element 2. In other words, the original shape of the connector 26 is columnar, and the connector 26 is disposed to have its longitudinal axis extending perpendicular to the longitudinal axis of the anode lead 14. The upper side of the connector 26 is disposed to contact the lower side of the anode lead 14 with the lower side of the connector 26 disposed in contact with the outer end, remote from the capacitor element 2, of the upper surface 28$u$ of the anode terminal 28. The outward facing portion of the originally columnar connector 26, remote from the capacitor element 2, is longitudinally cut away so that the resulting connector 26 has a semicircular transverse cross-section, or a transverse cross-section including an arcuate section and a straight line interconnecting the ends of the arcuate section. The amount cut away is from about one-third to about a quarter of the columnar connector 26, for example. If a connector having a shape of column is used, with its outermost side located inward of the distal end of the anode lead 14, the volume of the gap formed between the columnar connector and the first end surface 10 of the capacitor element 2 would be small. In contrast, since the connector 26 having a shape of a longitudinally cut column is used and connected to the distal end of the anode lead 14, the volume of the gap formed between the connector 26 and the end surface 14 of the capacitor element 2 is large.

If a columnar connector should be used, while keeping the large gap between the connector and the end surface of the capacitor element, the capacitor element must be of smaller dimensions, which means the capacitance of the capacitor element should be smaller, so that the volume efficiency cannot be large. In contrast, since the capacitor 1 of the described embodiment uses the connector 26 of the above-described arrangement, a larger capacitor element than a capacitor with a columnar connector can be used, and, therefore, the volume efficiency can be improved.

A resin package 36 covers the capacitor element 2, the anode lead 14, the cathode terminal 22, the connector 26 and the anode terminal 28, except for the lower surface 22l of the cathode terminal and the lower surface 28l of the anode terminal 28. The resin package 36 is formed by, for example, placing the capacitor element 2, the anode lead 14, the cathode terminal 22, the connector 26 and the anode terminal 28 in position in an appropriately shaped frame, filling the frame with, for example, a liquefied or powdery resin, and, then, curing the resin. The liquefied or powdery resin is placed to completely fill the space formed by the connector 26, the anode lead 14, the cover ring 16, the curved portion 32, the depression 30 and the lower surface 8 of the capacitor element 2. Since the connector 26 is formed to exhibit an arcuate inward facing surface and connected to the anode lead 14 at its distal end, as described above, the volume of the gap formed between the connector 26 and the first end surface 10 of the capacitor element 2 is large, and the liquefied or powdery packaging resin can enter past the curved portion 32 and the depression 30 into the space between the cathode terminal 22 and the anode terminal 28 to completely fill the space, too. Accordingly, no separate step is required to dispose a packaging resin between the depression 30 and the lower surface 8 of the capacitor element 2.

Furthermore, because of the presence of the curved portions 20 and 32, the liquefied or powdery resin can smoothly flows into the gaps or spaces past the curved portions, whereby the gaps and spaces can be filled with the resin completely. Since the curved portion 32 is spaced apart from the connector 26, the connector 26 does not obstruct the flow of the liquefied or powdery resin. According, sufficiently large insulation can be secured only by the resin package 36 between the anode terminal 28 and the capacitor element 2.

In the described example, the inner edge of the anode terminal 28 near to the capacitor element 2 is located beyond the first end surface 10 of the capacitor element 2 toward the mid point between the end surfaces 10 and 12 of the capacitor element 2, but it may be located, for example, near the first end surface 10. Also, in the described example, the outer edge of the depression is arcuately curved into the curved portion 32, but it may be slanted straight instead, for example.

In the described example, the connector 26 is shaped into a column with from about one-third to about a quarter of the column longitudinally removed so that it has a transverse cross-section formed of an arcuate section of a column and a straight line, or chord, interconnecting the opposite ends of the arcuate section. But the amount of the connector 26 removed is not limited to it, but it may be larger than zero but smaller than one-half.

REFERENCE SIGN LIST

1: Chip Capacitor
2: Capacitor Element
6: Upper Surface of Capacitor Element
8: Lower Surface of Capacitor Element
10: First End Surface of Capacitor Element
12: Second End Surface of Capacitor Element
14: Anode Lead
20: Curved Portion of Capacitor Element
22: Cathode Terminal
28: Anode Terminal
30: Depression
32: Curved Portion of Depression
36: Resin Package

What is claimed is:
1. A chip capacitor comprising:
a capacitor element having upper and lower surfaces and opposing first and second end surfaces extending perpendicular to said upper and lower surfaces, a cathode layer being formed on said surfaces of said capacitor element except for said first end surface;
an anode lead extending from said first end surface of said capacitor element;
an anode terminal having a first end portion located at a position slightly beyond said first end surface of said capacitor element toward said second end surface and beneath and near said lower surface of said capacitor element and having a second end portion located near a tip end of said anode lead, said anode terminal extending straight from said first end portion to said second end portion thereof, said anode terminal having said second end portion thereof connected to said anode lead;
a cathode terminal disposed beneath said lower surface of said capacitor element, being spaced from said first end portion of said anode terminal, said cathode terminal being connected to said lower surface of said capacitor element; and
a resin package packaging said capacitor element, said anode terminal and said cathode terminal;
upper surfaces of said anode and cathode terminals being substantially at a same level, lower surfaces of said anode and cathode terminals being substantially at a same level, said lower surfaces of said anode and cathode terminals being exposed through said resin package and having substantially a same area, a depression being formed in an upper surface of said anode terminal, said depression extending from said first end portion of said anode terminal to at least a position corresponding to said first end surface, said depression having a curved end portion in said second end portion, the resin of said resin package extending through said depression to said cathode terminal.

2. The chip capacitor according to claim 1, wherein said depression has a downward curving portion spaced from said first end surface of said capacitor element toward said lower surface of said anode terminal.

3. The chip capacitor according to claim 1, wherein a corner formed between said first end surface and lower surface of said capacitor element is rounded.

4. The chip capacitor according to claim 1, wherein said anode terminal and said anode lead are interconnected through a connector disposed on said upper surface of said anode terminal, being spaced from said depression, said connector having an arcuate surface facing said capacitor element and being connected to a distal end of said anode lead.

* * * * *